United States Patent [19]

Meucci

[11] 4,114,466
[45] Sep. 19, 1978

[54] SPEED CONVERTORS FOR PROVIDING VARIABLE DRIVE RATIOS

[76] Inventor: Amleto Meucci, Via Giuseppe Cei 99, I-56021 Cascina, Pisa, Italy

[21] Appl. No.: 757,141

[22] Filed: Jan. 6, 1977

Related U.S. Application Data

[63] Continuation of Ser. No. 537,712, Dec. 31, 1974, abandoned.

[51] Int. Cl.² ............................................. F16H 29/04
[52] U.S. Cl. .................................................... 74/117
[58] Field of Search ................................. 74/117, 541

[56] References Cited

U.S. PATENT DOCUMENTS

| | | |
|---|---|---|
| 1,072,237 | 9/1913 | Johnson et al. ........................ 74/117 |
| 1,957,196 | 5/1934 | Bonnet ..................................... 74/117 |
| 2,014,954 | 9/1935 | Sheridan .................................. 74/117 |
| 3,987,682 | 10/1976 | Roantree ................................ 74/117 |

Primary Examiner—Benjamin W. Wyche
Assistant Examiner—Wesley S. Ratliff, Jr.
Attorney, Agent, or Firm—Hopgood, Calimafde, Kalil, Blaustein and Lieberman

[57] ABSTRACT

A speed convertor for providing a variable drive ratio, comprises a first rotary body having a toothed rim, and a second rotary body carrying a plurality of unidirectional drive transmitting members, for example pawls or free wheel devices, which co-operate with the rim. The two bodies are rotatable about parallel axes, the relative eccentricity of the axes being variable to vary the drive ratio between the bodies.

5 Claims, 13 Drawing Figures

SPEED CONVERTORS FOR PROVIDING VARIABLE DRIVE RATIOS

This is a continuation of application Ser. No. 537,712, filed Dec. 31, 1974, now abandoned.

FIELD OF THE INVENTION

The present invention relates to a speed convertor for providing a variable drive ratio between a driving member and a driven member.

SUMMARY OF THE INVENTION

According to the present invention there is provided in a speed convertor, at least one drive unit, said unit comprising a first rotary body, said first body comprising a toothed rim, a second rotary body, a plurality of oscillatory arms mounted on the second body, unidirectional means at the ends of the arms for co-operating with the toothed rim, said unidirectional means and said rim co-operating to effect drive transmission between the two bodies, the two rotary bodies being rotatable about parallel axes, and means operative to vary the distance between said rotational axes to obtain a variable eccentricity of the two bodies, the eccentricity determining the drive ratio between the first and second bodies, at each revolution each of the unidirectional means being cyclically active with respect to the other means, and the gear ratio being the same for reversed drive and being equal to unity at zero eccentricity of the first and second bodies.

BRIEF DESCRIPTION OF THE DRAWINGS

Embodiments of the invention will now be described, by way of example only, with reference to the accompanying diagrammatic drawings, in which.

DESCRIPTION OF THE PREFERRED EMBODIMENTS

Figure 1:
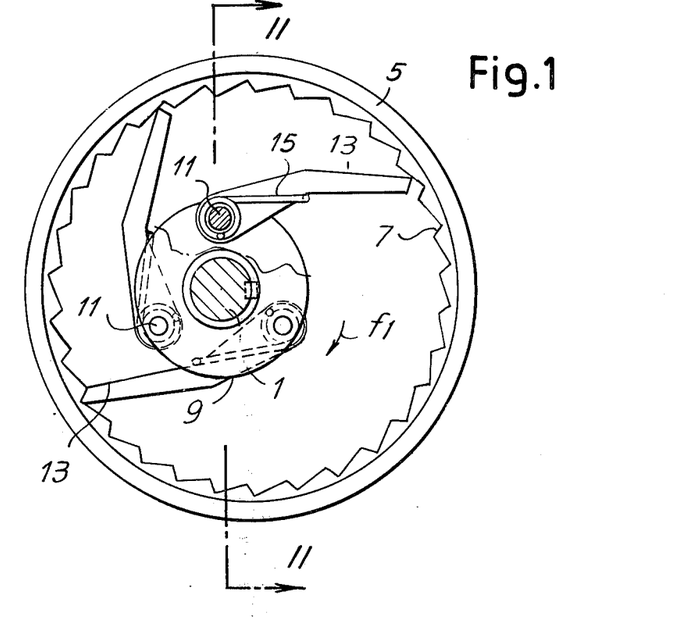
FIG. 1 is an axial elevation of a speed convertor in accordance with the present invention.
Figure 2:
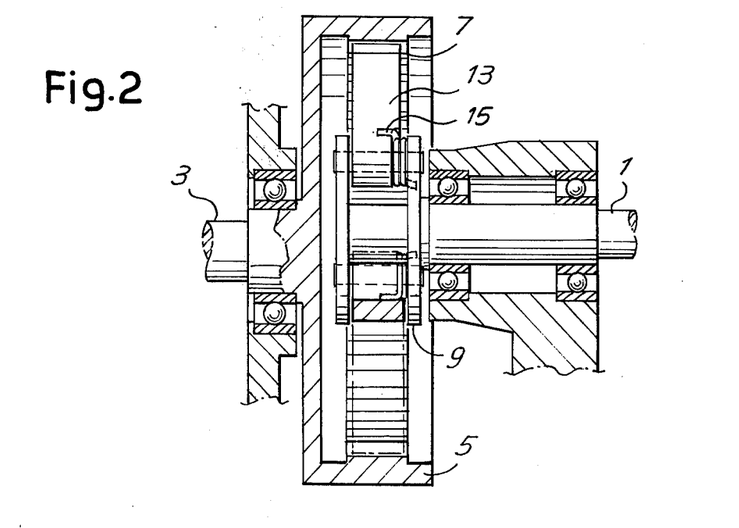
FIG. 2 is a section taken on line II—II of FIG. 1.

With reference to FIGS. 1 and 2, a driving shaft 1 is rotatable in the direction of arrow $f1$ and a driven shaft 3 is rotatable about an axis parallel to, and spaced from, the axis of the shaft 1. The shaft 3 is rigid with an annular member 5 having an inner rim 7 with ratchet teeth, the shaft 3, the member 5 and the rim 7 constituting a driven assembly. The shaft 1 is rigid with an annular member 9 located within the rim 7, and to which a plurality (three in the embodiment shown) of pawls 13 is connected by means of pins 11. The pawls 13 are biased by springs 15 in an outwards direction so that the free ends of the pawls 13 are directed towards the rim 7. A temporary entraining action of the assembly 7, 5, 3 is effected by that one of pawls 13 which has its free end portion located nearest to the axis of the shaft 1 and in driving engagement with the ratchet teeth of the rim 7.

The entraining effect on the assembly 7, 5, 3 varies with the eccentricity of the shafts 1 and 3, that is with the axial misalignment between the axes of the shafts 1 and 3. The greater the eccentricity, the greater will be the difference from unity of the drive ratio between the driving assembly formed by the shaft 1 and the member 9 and the driven assembly 3, 5, 7. In the arrangement shown in FIGS. 1 and 2, the driven assembly has a greater average speed than that of the driving assembly. Continuously during rotation, the distance of the free end portion of one of the pawls 13 from the axis of the shaft 1 decreases whereby this pawl becomes the active pawl in driving engagement with the rim 7, whereas the previously active pawl begins to jump or ride over the teeth of the rim 7; the other inactive pawl also jumps over the teeth of the rim 7. By continuously varying the eccentricity, the drive ratio can be continuously varied. The eccentricity may be provided in any radial direction.

The speed convertor described above may also operate in the reverse manner, that is, with the assembly 3, 5, 7 being the driving assembly, and the assembly 9, 1 being the driven assembly; for this purpose the direction of rotation is reversed with respect to that of the arrow $f1$, while the same drive ratio is obtained. In this case, the teeth of rim 7 transmit drive to the free end portions of the pawls, the pawls being in an active and an inactive state during the rotation, in a similar manner to that described above.

Figure 5:
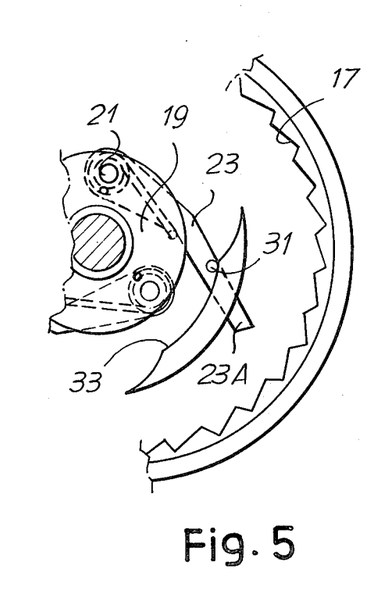
FIG. 5 is a fragmentary axial elevation showing means for temporarily disengaging a pawl from a toothed rim of a drive transmitting unit.

In each case, the convertor has inactive pawls which ride or jump over the teeth along a certain circumferential arc. In order to avoid this effect, fixed means can be provided to engage the pawls along the arc in which the pawls are inactive whereby to move the free end portions of the inactive pawls away from the toothed rim. Such an arrangement in shown in FIG. 5, in which a pawl 23 — pivoted at 21 on a rotary annular member 19 — is engageable with an internally toothed rim 17. The pawl 23 has a lateral pin-like projection 31 arranged to cooperate with a fixed profile 33 extending along a predetermined arc. The profile 33 is shaped to effect a slight angular movement of the pawl 23 around the pivot 21 in a counterclockwise direction (irrespective of the rotational direction of the two assemblies) sufficient to obtain a separation of the free end 23A of the pawl 23 from the rim 17. In this way, the jumping action can be restricted or substantially eliminated.

In the embodiment of FIGS. 1 and 2, the pawls 13 are substantially coplanar and co-operate with a single toothed rim. In this arrangement, the number of pawls is limited by the space required by each pawl, since it is also necessary to restrict the overall dimensions of the convertor that is the diametral dimensions of the toothed rim. Although the convertor can be considered to produce an average constant drive ratio, the instantaneous ratio does vary cyclically from the beginning to the end of the active stage of each pawl, this variation being repeated as each subsequent pawl becomes active;

the higher the number of pawls, the greater is the continuity and uniformity of the drive, that is the smaller are the cyclical variations of the ratio.

Figure 3:
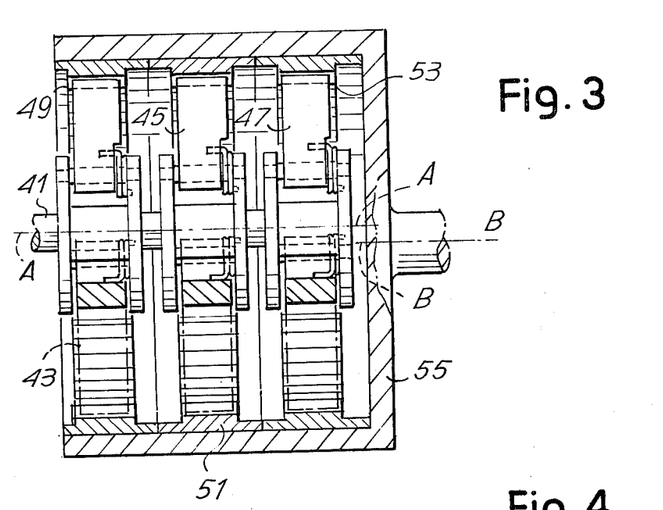
FIG. 3 is a longitudinal section of a speed convertor comprising a plurality of drive transmitting units arranged in parallel.

An increase in the number of the pawls in relation to that which can be provided in a coplanar arrangement, can be obtained as shown in FIG. 3, in which on a rotary member 41 there are provided several series of pawls 43, 45, 47 lying in different planes and co-operating with respective toothed rims 49, 51, 53 or with a single, wide, toothed rim. In each case, the toothed rim or rims are carried by a member 55 rotatable about an axis B—B having an adjustable eccentricity with respect to the axis A—A of the member 41. The series of pawls 43, 45, 47 enables a substantially uniform drive ratio to be obtained between the members 41 and 50. It will be noted that this arrangement may also be used to permit an increase in the power to be driven or transmitted, with respect to that permitted by a single series of pawls. As will be apparent, this embodiment, in effect, comprises a plurality of drive-transmitting units, equivalent to the unit provided by the elements 5 to 13 of FIGS. 1 and 2, arranged in parallel.

Figure 4:
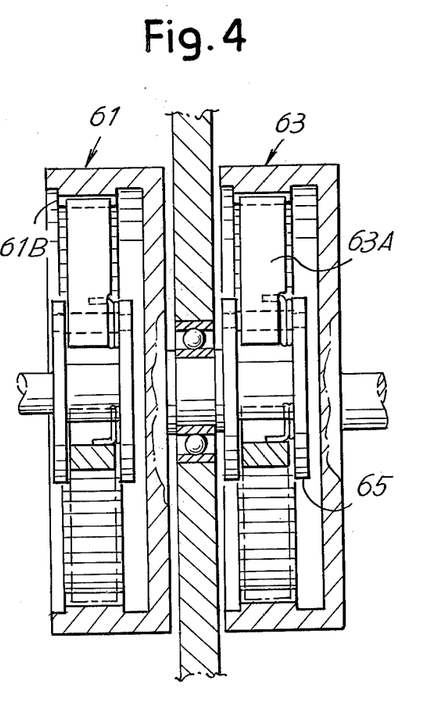
FIG. 4 is a longitudinal section of a speed convertor comprising a plurality of drive transmitting units arranged in series.

The drive ratio can be varied within limits which are not very wide from the unity, as a function of the eccentricity between the driving and driven axes. To increase the drive ratio, several units as shown in FIGS. 1 and 2 or FIG. 3 can be arranged in series, that is, in such a manner that the overall drive ratio is equivalent to the product of the drive ratio of each individual units. An arrangement of this kind is shown in FIG. 4 wherein two drive units 61 and 63 are assembled in series, the pawls 63A of the unit 63 being assembled on a member 65 rigid with a toothed rim 61B of the other unit.

With an arrangement of active rotary or fixed members, the drive can be interrupted, that is, placed in "idle" mode through the simultaneous separation from the toothed rim of the free end portions of all the pawls which cooperate with that rim, for example all the pawls 13 of FIG. 1 or all the pawls 43, 45, 47 of FIG. 3. Such an effect can be provided by means similar to that shown in FIG. 5 for a single pawl.

In FIGS. 6 to 8, 71 indicates a casing which includes end supports 71A and 71B with rolling bearings for an input shaft 73 and for an output shaft 75. An intermediate support is formed by a partition 71C of the casing 71 (see FIG. 6) for a connecting shaft 77, coaxial with the shafts 73 and 75. The shaft 73 is rigid with a body 79 rotatable inside the casing 71 and including a first flange or disc portion 79A connected to the shaft 73, a cylindrical shell portion 79B forming an internal toothed rim 81, and an annular portion 79C. The parts 79A and 79B have internal roller tracks 83 and 85. Similar rotary bodies 87, 89 and 91 are also provided in the interior of the casing; the bodies 87, 89 have flange portions 87A and 89A connected to the connecting shaft 77 and the body 91 has a flange portion 91A connected to the shaft 75. The rotary bodies 79 and 87 have circular openings, defined by facing annular portions 79C and 87C, and correspondingly the bodies 89 and 91 have circular openings defined by facing annular portions 89C and 91C.

Figures 8, 9:
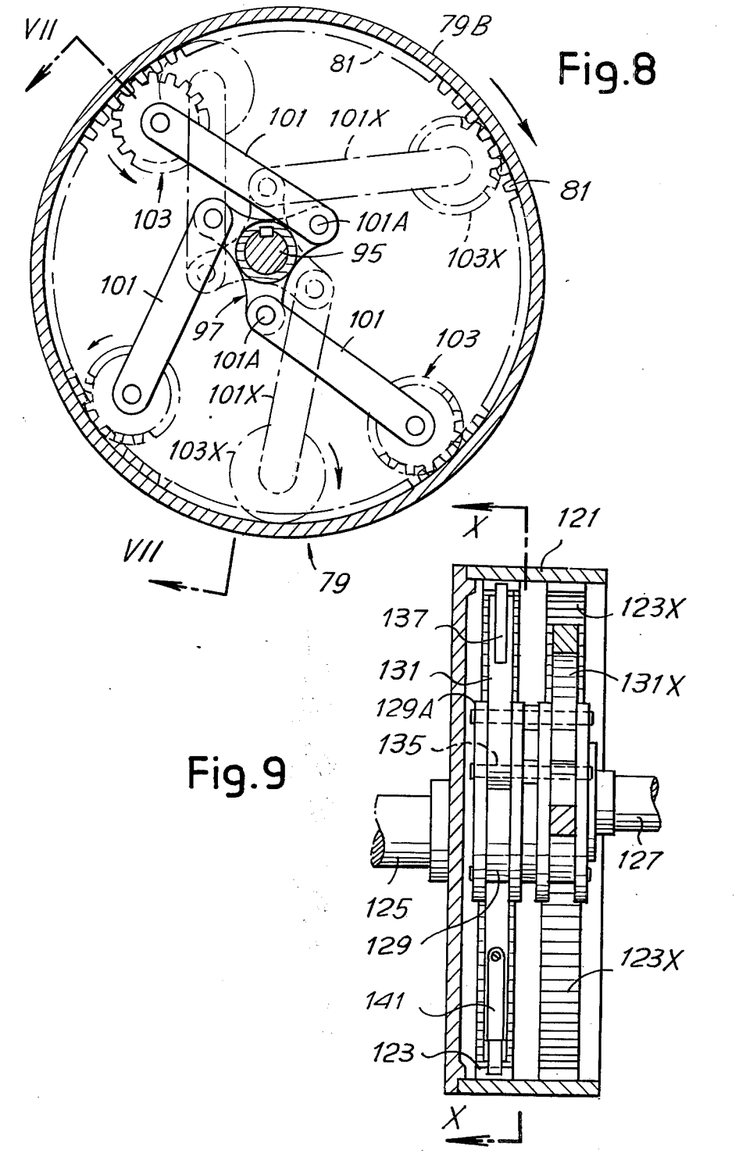
FIG. 8 is a section taken on line VIII—VIII of FIG. 7.
FIG. 9 is an elevation, partially in section, of a still further embodiment of the invention.

A first arm 93A of a movable bifurcated member 93 extends between these two bodies 79 and 87, the movable member 93 being movable in the direction indicated by the double arrow f10; the second arm 93A of the member 93 extends between the bodies 89 and 91. The arm 93A of the movable member 93 supports, through suitable rolling bearings, a shaft 95, which carries rotary bodies 97 and 99, carrying the pawls. The body 97 has two flange portions each defined by a disc or, as shown, a plurality of angularly spaced arms. A plurality of arms 101 are linked to each flange portion by means of pivots 101A. This arrangement is clearly shown in FIG. 8 wherein these arms 101 are inclined with respect to a radial line, and each arm carries at its free end portion an engaging member formed by a unidirectional free wheel device 103, an outer unidirectional drive transmitting member of which is in the form of a gear meshing with the toothed rim 81 of the rotary body 79. As shown in FIG. 8, the arms 101 linked to one of the flange portions of the body 97 are inclined in the counterclockwise direction, and the arms (designated 101X) linked to the other of the flange portions of the body 97 are inclined in the clockwise direction. The unidirectional free wheel devices, carried by the arms 101X are designated 103X and mesh with the same toothed rim 81. The outer geared transmitting members of the devices 103 can rotate only in the counterclockwise direction and those of the devices 103X can rotate only in the clockwise direction. Each arm 101 and 101X carries laterally outside of the rotary path of the arm, a roller 105 engageable with the track 83 or 85 respectively in such a manner that the outer geared transmitting members of the free wheel devices 103 and 103X remain permanently in mesh with the toothed rim 81. The rotary bodies 87, 89, 91 are of similar construction to the body 79 and carry a similar internal assembly to that shown for the rotary body 79.

Figure 6:
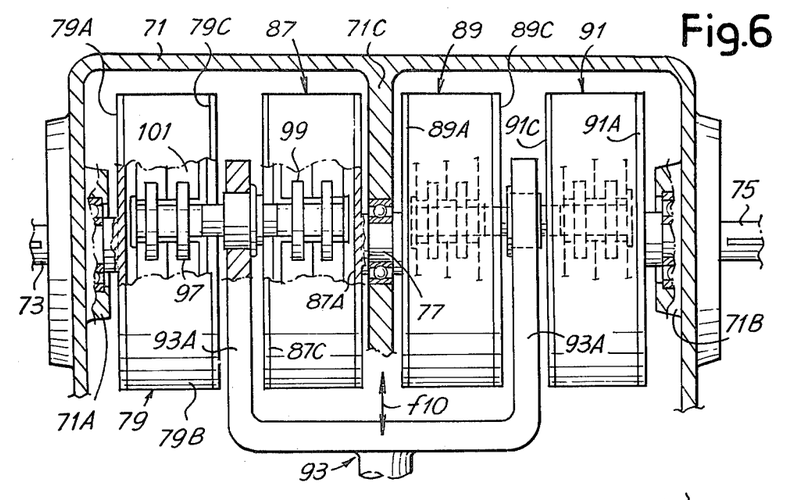
FIG. 6 is an elevation, partially in section, of a further embodiment of the invention.
Figure 7:
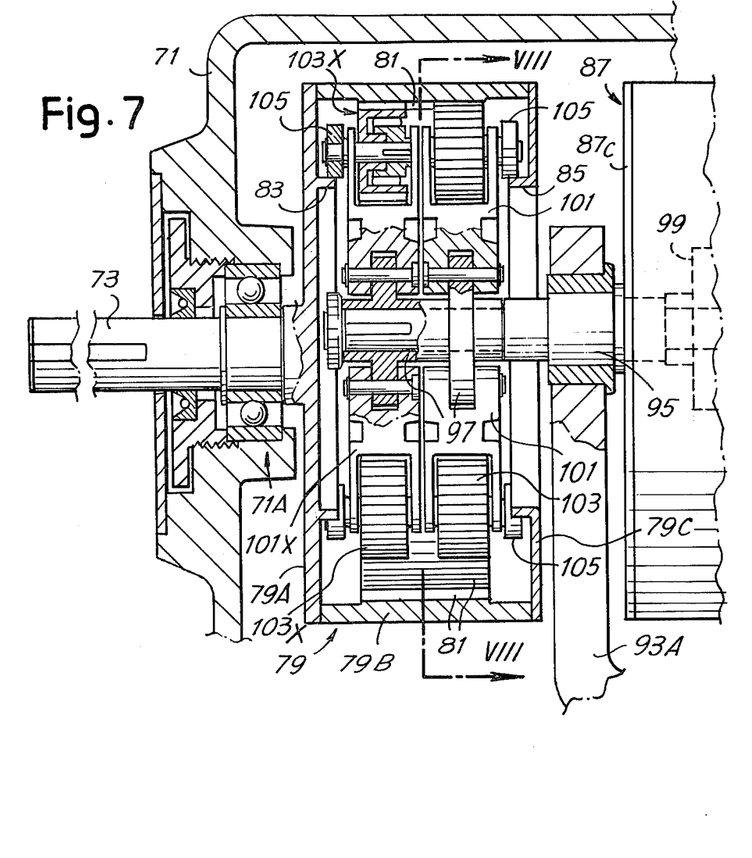
FIG. 7 is a section, taken on line VII—VII of FIG. 8 and showing, to an enlarged scale, a detail of FIG. 6.

The operation of each of the drive units formed by a rotary body such as that denoted by 79, 87, 89, 91 and by the associated internal assembly such as 95, 97, 101, 103, 101X, 103X relative to the body 79, corresponds to that of the drive units described in the previous embodiments. The eccentricity between the shafts 73 and 95 is variable according to the drive ratio required between the two shafts. The overall drive ratio between the shaft 73 and the shaft 75 is equal to the product of the individual drive ratio of each of the drive units.

Considering for example the drive unit comprising the body 79, wherein the shaft 73 is the input shaft and the shaft 95 is the output shaft, at any instant drive is transmitted from the shaft 73 to the shaft 95 by that one of the free wheel devices 103 which is located at the least distance from the axis of the shaft 95. The other free wheel devices 103 do not, however, transmit drive because their outer geared members are rotated by the rim 81, in a counterclockwise direction due to the counterclockwise movement of the body 97 by the action of that one of the free wheel devices 103 which is located at the least distance from the axis of the shaft 95. The greater the eccentricity between the axes of the shafts 73 and 95, the greater is the speed with which that free wheel device 103 located at the least distance from the axis of the shaft 95, moves the body 97. By decreasing the eccentricity to zero, the drive ratio progressively moves towards unity this being achieved when the shafts 73 and 95 are coaxial. When the same geometric conditions are provided in each of the drive units the overall drive ratio is equal to the fourth power of the drive ratio of the individual units. The same drive ratio is obtained for a given eccentricity both in the case when the drive is transmitted from the toothed rim to the internal assembly which carries the free wheel devices, and when the drive is transmitted in the reverse sense, that is from the internal assembly to the toothed rim.

In each drive unit, instantaneously only one free wheel device serves to transmit the drive, all the other free wheel devices in the group, such as 103, remaining inactive and the free wheel devices of the other group such as those 103X also remaining inactive. The latter are used only in the case of a drive in the reversed direction, that is when the shaft 75 is the input shaft and the shaft 73 is the output shaft. The free wheel devices 103X substantially prevent the entire assembly from acting as a free wheel device. This is advantageous, for instance, in the application of the speed convertor to motor vehicles, where the drive usually takes place between the engine and the drive wheels, but where there is also required a braking effect on the wheels through the drive gear by means of the engine, for instance, when the vehicle is travelling downhill. During this condition the free wheel devices such as those denoted by 103X act in a similar, but reverse, manner to the devices 103.

In each drive unit the drive does not take place under fully uniform conditions, since the drive ratio gradually increases as the distance between the active device and the axis of the shaft 95 reduces, and thereafter the drive ratio decreases as the distance between the active device and the axis of the shaft 95 increases until a subsequent free wheel device effects drive transmission. The shorter the active period of each free wheel device (or pawl in the case of the earlier embodiments), the more uniform is the drive. By providing several drive units operating in series, and by arranging the different drive units with a relative angular displacement of the angular positions in which the free wheel devices or the pawls of the different units are located, the uniformity of the drive can be increased.

Figure 10:
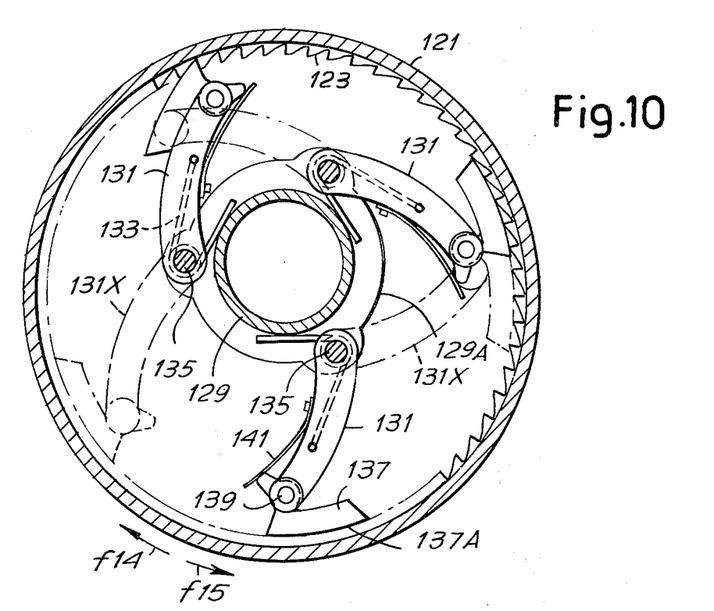
FIG. 10 is a section taken on line X—X of FIG. 9.

In FIGS. 9 and 10 there is shown an arrangement similar to that of the earlier embodiments, with pawls engageable with an inner toothed rim. These pawls are constructed in such a manner that they do not jump across the teeth during their inactive phase. In this embodiment, 121 denotes a cylindrical member which has axially spaced toothed rims 123 and 123X, the member 121 being carried by a shaft 125. A shaft 127, eccentric with respect to the axis of the shaft 125, carries a structure 129 located within the member 121 and carrying — by means of flange projections 129A — two sets of pivotal arms 131 and 131X oriented in opposite inclinations. Each arm 131 or 131X is biased outwardly by a spring 133 about its respective pivot 135, in such a manner as to cause its free end portion to approach the associated toothed rim 123, 123X. At its free end portion, each arm 131 and 131X carries a pawl 137 pivotal about a respective pin 139 and biased in a counterclockwise direction by a small spring 141. Each pawl 137 has an arcuate surface 137A, by means of which it may rest on the cylindrical surface defined by the tips of the teeth of the rims 123 or 123X. In the case of the pawls 137 carried by the arms 131, when the member 121 rotates in the direction indicated by the arrow $f14$ of FIG. 10, with respect to the pawl, the pawl does not jump across the teeth of the rim 123 but slides on its surface 137A over the tips of the teeth. When the member 121 is moved in the direction of the arrow $f15$ of FIG. 10 with respect to the pawl, the latter is urged by the spring 141 and by the entraining effect imposed by the relative movement of the member 121 with respect to the pawl, to rotate in a counterclockwise direction, as viewed in FIG. 10, around the pivot 139 and thus to be engaged with the toothed rim, as shown of the topmost pawl illustrated in FIG. 10. In this way the pawl quickly attains an active drive transmitting condition whereas jumping of the pawl is obviated when the pawl is not in an active condition.

Figure 11:
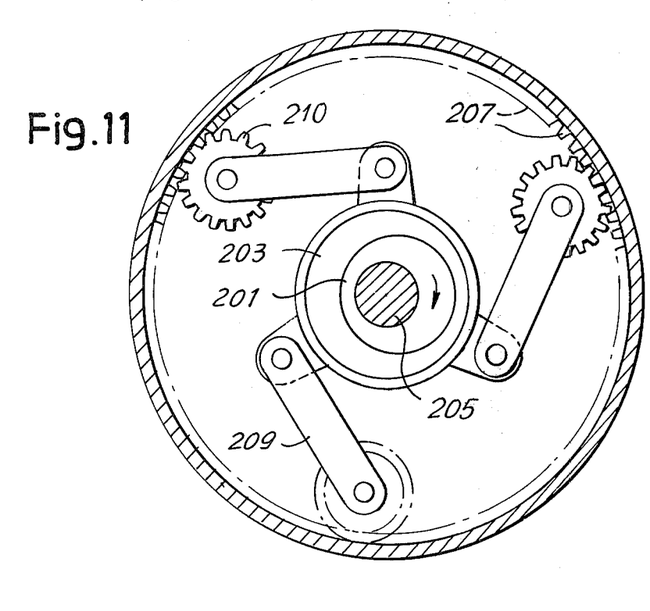
FIGS. 11 to 13 are schematic axial elevations of yet further embodiments of the invention.
Figure 12:
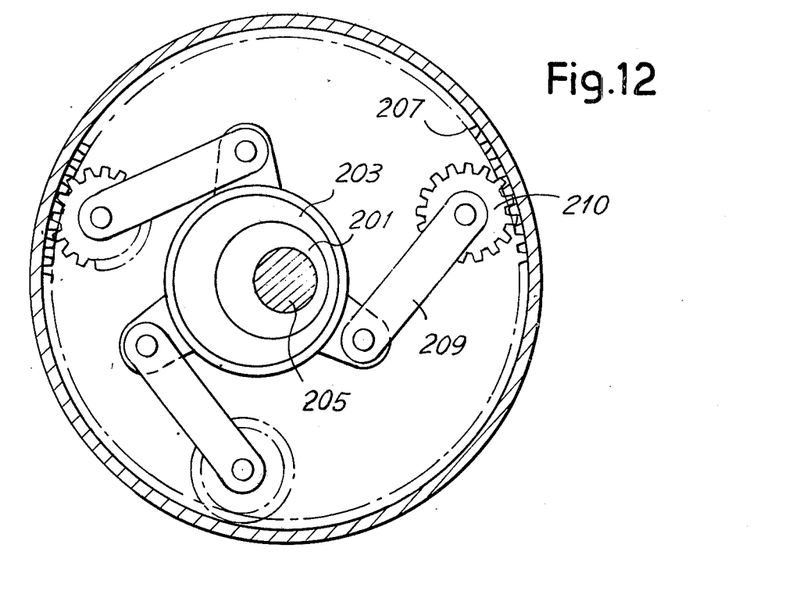
Figure 13:
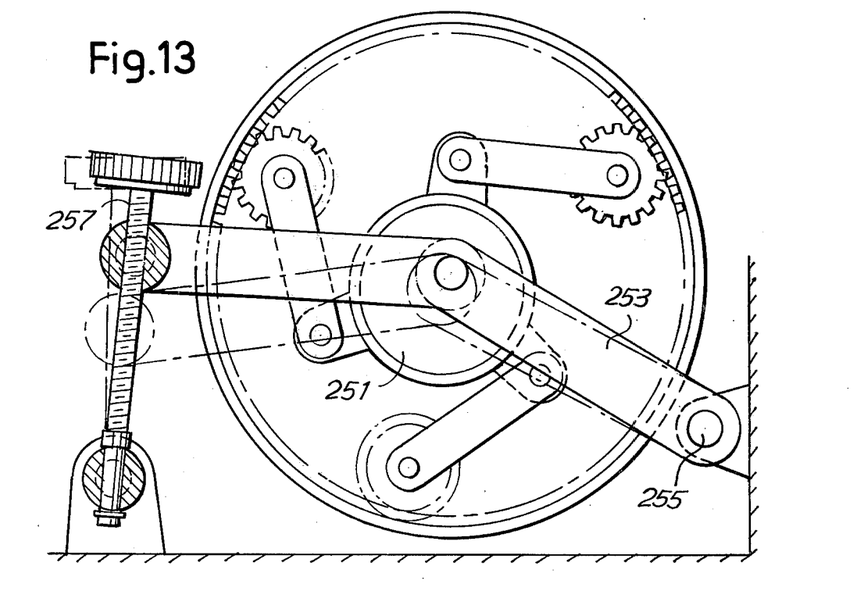

In FIGS. 11 and 12 there is shown an embodiment wherein the variation in eccentricity is obtained using a pair of eccentric members 201 and 203. The member 201 is eccentrically mounted on a shaft 205 which is coaxial with an internally toothed rim 207. The member 203 is eccentrically mounted on the eccentric member 201. By adjusting the relative angular positions of the two eccentrics, the eccentricity of the member 203 with respect to the shaft 205 can be adjusted from zero to a value double the eccentricity of the two eccentrics in an arrangement wherein the eccentricity of each member is the same. A group of oscillatory arms 209, carrying pawls or free wheel devices 210 meshing with the toothed rim 207, is carried by the outer member 203. A similar arrangement is shown in FIG. 13 in which an outer eccentric member 251 is mounted on at least one arm 253 pivoted at 255 and movable for example by rotating a threaded shaft 257.

What is claimed is:

1. A first group of shafts including an input and an output shaft, all of said first group of shafts having parallel rotational axes that are fixed with respect to each other;
   a plurality of first rotary bodies having toothed rims, each of said first rotary bodies being attached to, and rotatable about an axis defined by one of said first group of shafts;
   first support means connecting said first group of shafts;
   a second group of shafts;
   a plurality of second rotary bodies, each of said second rotary bodies being attached to, and rotatable about an axis defined by one of said second group of shafts, each of said plurality of second rotary bodies being arranged within one of said first plurality of rotary bodies to form one of a plurality of drive units;
   second support means connecting said second group of shafts;
   a plurality of oscillatory arms mounted on each of said second bodies, each of said oscillatory arms having a first end attached to said second body and a free end, said free ends of the oscillatory arms being at different distances from the second shaft which is attached to said second body;
   unidirectional means attached to the free ends of each of said oscillatory arms, said unidirectional means cooperating with the toothed rim of said first rotational body of each drive unit during a predetermined portion of each rotation of said second body to effect drive transmission between said first and second bodies of each drive unit;
   first means, including said plurality of oscillatory arms, which are operative to vary the distance between said first and second shafts of each drive unit to obtain a variable eccentricity of the first and second rotational bodies of each drive unit, which eccentricity determines the drive ratio of each drive unit; and
   second means to move one of said first and second support means relative to the other to vary the eccentricity of said second group of shafts with respect to said first group of shafts and thereby vary the drive ratio of all of said plurality of drive units.

2. The convertor of claim 1 in which said second support means is movable and said first support means is fixed.

3. The convertor of claim 1 in which said input and said output shafts are concentric.

4. A convertor as claimed in claim 1 having four of said driving units connected in series in which said second support means includes a U-shaped movable member having a first leg which extends between the first and second of said driving units and supports a first one of said second group of shafts which extends respectively into said first and second ones of said first rotatable bodies and has the first and second ones of said second rotatable bodies mounted thereon and a second leg which extends between the third and fourth driving units and supports a second one of said second group of shafts which extends respectively into said third and fourth ones of said first rotatable bodies and has the third and fourth ones of said second rotatable bodies mounted thereon; and means to move said second support means causing said second group of rotatable shafts and said attached second rotatable bodies to move relative to said first rotatable bodies.

5. A convertor according to claim 1, wherein said driving units are arranged in two pairs in series to provide two outer unites and two inner units between said outer units, the toothed rims of the inner units being supported coaxially with respect to the toothed rims of the outer units, said convertor further comprising a bifurcated member forming a part of each unit carrying two pairs of said second bodies.

* * * * *